April 24, 1934.    G. A. HOLMES    1,956,029
SEPARABLE FASTENER
Filed Jan. 15, 1932

Inventor:
George A. Holmes,
by Emery, Booth, Varney & Townsend
Attys

Patented Apr. 24, 1934

1,956,029

UNITED STATES PATENT OFFICE 1,956,029

SEPARABLE FASTENER

George A. Holmes, Newton, Mass., assignor to United-Carr Fastener Corporation, Cambridge, Mass., a corporation of Massachusetts Application January 15, 1932, Serial No. 586,876

6 Claims. (Cl. 24—221)

This invention relates to separable fasteners and the object is to provide an improved device of this class which, while not limited thereto, finds a particularly advantageous application to the fastening of the cowling of airplanes.

My invention will be well understood from the following description of an illustrative embodiment thereof in a fastener of the turnbutton type as shown in the accompanying drawing, wherein:—

Figure 1:
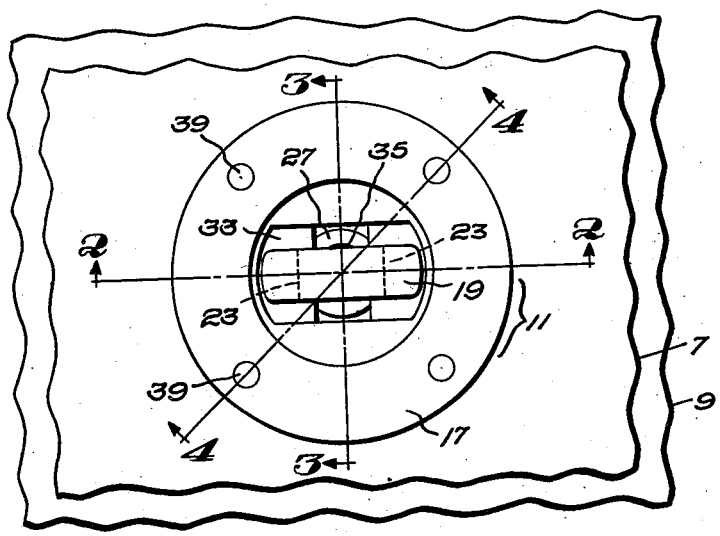
Fig. 1 is a plan of two plates secured together by the fastener, the parts of the fastener being shown released or unlocked but not separated.

Referring to the drawing, I have there shown two plates 7 and 9 secured together by means of a fastener of the turnbutton type embodying an eyelet 11 and a part 13 which usually, as shown, will be separate members secured to the plates. Herein I have shown these parts as secured to the relatively remote faces of the two plates as they lie one over the other and in alignment with suitable apertures therein, which apertures provide for the interengagement of the two parts of the fastener and for access thereto for manipulation of the same. Herein the eyelet 11 takes the form of a cup-shaped member 15 having a flange 17 adapted to overlie the face of the plate 7 and be secured thereto, the body of the cup extending through the aperture in plate 7 and being adapted to extend into and fit snugly into the opening in the plate 9 so that lateral movement of the two plates is resisted by the body of the cup independently of the engagement of the same by the cooperating fastener element. The bottom of the cup is formed as one element of a separable fastener adapted to be joined to a cooperating element carried by the part 13 secured at the further side of the plate 9.

Figure 2:
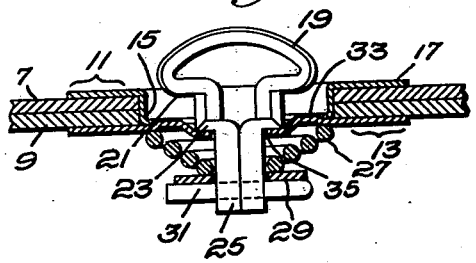
Fig. 2 is a section on the line 2—2 of Fig. 1.
Figure 3:
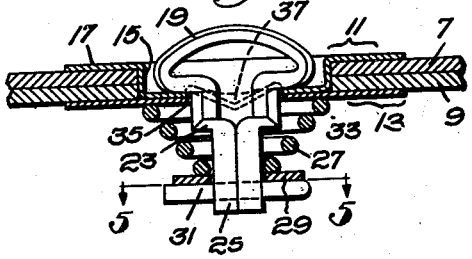
Fig. 3 is a section on the line 3—3 of Fig. 1 but showing parts of the fastener locked.
Figure 5:
Fig. 5 is a section on the line 5—5 of Fig. 3.

The fastener herein shown is of the turnbutton type and thus the bottom of the cup is formed as an eyelet with the oblate opening adapted alternatively to be spanned by or to pass the button head 19 according to whether it is turned to the position of Fig. 3 transversely of the longer dimension of the opening or to the position of Figs. 1 and 2 in alignment therewith. The button member may conveniently be formed of a length of half-round wire bent centrally to form the head 19 with the shoulders 21 and preferably formed with the co-planar inner shoulders 23 from which the two portions of the wire extend in face to face relation, as seen in Fig. 5, to form a shank 25 swivelling in the part 13. The edges of the wire may be slabbed off, as shown on the sides of head 19. The button member is normally retracted by a spring, preferably the helical conical spring 27 herein illustrated interposed between part 13 and a suitable washer 29 surrounding shank 25 and held in position thereon by the cotter pin 31.

The part 13 is preferably formed about the point of attachment of the button thereto with a pressed-up boss 33 adapted, as best seen in Fig. 2, to fit up into the eyelet opening in the bottom of the cup 15. This boss may be cut away to provide an opening 35 transverse to the eyelet opening and of such a size as to pass or be spanned by the inner shoulders 23 depending upon the angular position of the button. In one position the head is retracted by the spring to the position of Fig. 3 so that the shoulders 21 engage the bottom of the cup 15 and hold the parts of the fastener securely together. In forming opening 35 the side walls of boss 33 preferably are cut away so that shoulders 21 may be drawn into these cut-away portions, as indicated in Fig. 3, and the inner or secondary head formed by shoulders 23 is received within the space provided by the conical spring. In this position head 19 is locked against rotation until retracted against the force of spring 27. In the latter position above referred to, the head 19 is in alignment with the larger dimension of the opening in the bottom of the eyelet thereby permitting the eyelet to be withdrawn over the head. In this position the boss 33 engages under shoulders 23 and supports the same in the relatively elevated position shown in Fig. 2. As best seen in Fig. 3, the boss may be provided with an angle-sided groove 37 transverse to opening 35. Thus the shoulders 21, because of the angled sides of the groove, tend to ride into the proper position under the pull of the spring shown in Fig. 3 even if turned only approximately to that position.

In the arrangement described it will be noted that in the locked position of the parts, as seen in Fig. 3, the head is to a substantial degree received within the hollow of the cup 15 out of harm's way and where it will offer little wind resistance, a point of advantage in airplane work, whereas in the released position it is elevated so as to be readily noticeable and thus signal to the casual observer that the parts of the fastener are not locked together.

Figure 4:
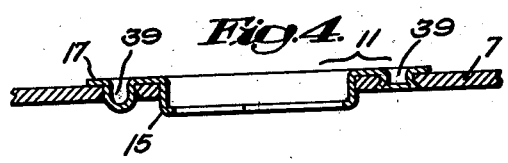
Fig. 4 is a section through one of the plates and the element of the fastener carried thereby on the line 4—4 of Fig. 1 and showing said element only partly secured.

The elements of the fastener may most conveniently be secured to the plates 7 and 9 in the manner illustrated in the case of the eyelet member 11 and the plate 7 in Fig. 4. I have therein shown the flange 17 of the eyelet member as struck up at intervals thereabout to form the hollow cups 39 which may pass through suitable openings in the plate 7, as illustrated at the left in Fig. 4, and be headed or riveted over, as shown at the right in that figure. This provides a simple and secure method of attachment without the need of utilizing separate fastening members. The part 13, while not being illustrated as such, is intended to be secured to the plate 9 in the same manner as the eyelet member 11 is secured to the plate 7 and in each case the headed-over parts of these integral hollow rivets are substantially flush with the surface of the plate and they do not leave any through openings in themselves and close up the holes in the plate 7.

The boss 33 is of such shape that it coordinates with the wall of the opening in the bottom of the cup 15 to prevent relative rotation of the parts 7 and 9. The boss 33 is about flush with the surface of the bottom of the cup 15 and does not project into the cup. Thus the surface at the bottom of the cup remains smooth and free from projections which would interfere with the rotation of the button by engagement with the shoulders 21.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a pair of apertured plates, a fastener of the turnbutton type comprising an apertured cup-shaped eyelet mounted on one plate in alignment with the aperture therein and fitting into the aperture in the other plate and a turn button carried by the latter plate and passing through an aperture therein and means on said turnbutton to pass through the aperture in the cup-shaped eyelet and engage the bottom of the cup in one position of the turnbutton.

2. In combination with a pair of rigid apertured plates, means for securing them together comprising elements of a turnbutton fastener mounted on the relatively remote faces of the plates, one of said elements having a portion about equal to the thickness of the combined plates and extending through and fitting both apertures and a turnbutton carried by one of said elements and adapted to pass through an aperture in the other of said elements in one position of the turnbutton and to engage that element in another position of the turnbutton to secure the parts together.

3. A fastener of the turnbutton type comprising a cup-shaped eyelet having an oblate opening in its bottom, a cooperating member comprising a part having a smaller oblate opening, a spring-retracted button carried by said part having an outer end shaped and arranged to pass or span the opening in the eyelet in different predetermined positions of angular adjustment and an inner head shaped and arranged to span or pass the opening in said button carrying part in said respective positions, and said button being of such dimensions that when the fastener is engaged said outer head is substantially received in said cup and when it is released it projects noticeably therefrom.

4. In combination with a pair of apertured plates, fastening means therefor of the turnbutton type comprising a cup-shaped eyelet carried by one plate in alignment with the aperture therein and fitting into the aperture in the other plate, said eyelet having an oblate opening in its bottom, a part carried at the further side of the other plate having a boss fitting said oblate opening and a spring-retracted button mounted on said boss.

5. In combination with a pair of apertured plates, fastening means therefor of the turn button type comprising a cup-shaped eyelet carried by one plate in alignment with the aperture therein and fitting into the aperture in the other plate, said eyelet having an oblate opening in its bottom, a part carried at the further side of the other plate having a boss fitting said oblate opening and a spring-retracted button mounted on said boss, the boss being recessed to position the button.

6. In combination with a pair of apertured plates, fastening means therefor of the turnbutton type comprising a cup-shaped eyelet carried by one plate in alignment with the aperture therein and fitting into the aperture in the other plate, said eyelet having an oblate opening in its bottom, a part carried at the further side of the other plate having a boss fitting said oblate opening and a spring-retracted button mounted on said boss, said button having two heads shaped and arranged so that one is adapted to engage the bottom of the eyelet in one position of the button and the other is adapted to engage the boss on said part in another position of the button.

GEORGE A. HOLMES.